Feb. 14, 1933.  J. P. FERRIS  1,897,386
BROACHING MACHINE
Filed May 31, 1930    2 Sheets-Sheet 1
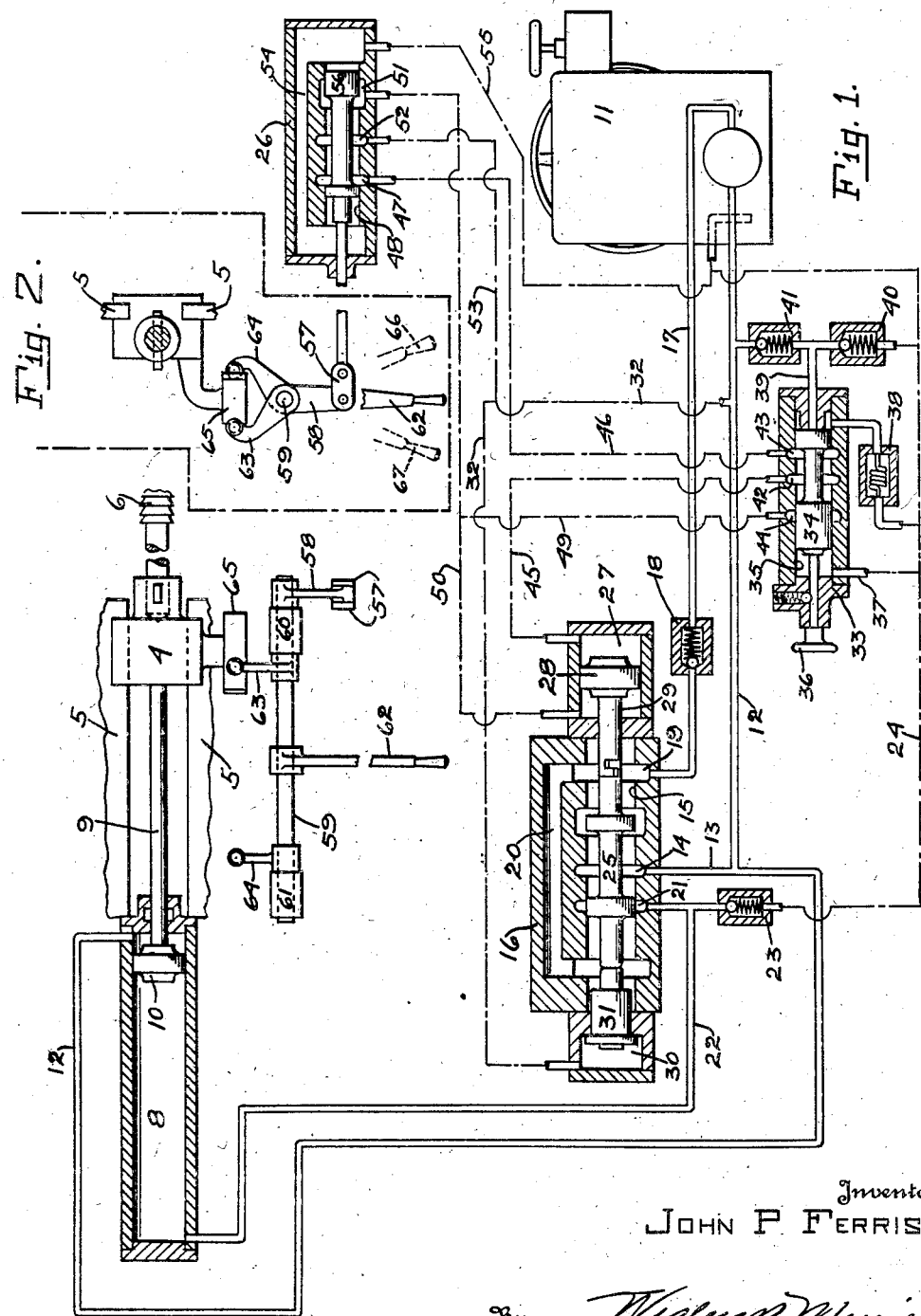
Inventor
JOHN P. FERRIS
By
Attorney Feb. 14, 1933.  J. P. FERRIS  1,897,386
BROACHING MACHINE
Filed May 31, 1930    2 Sheets-Sheet 2
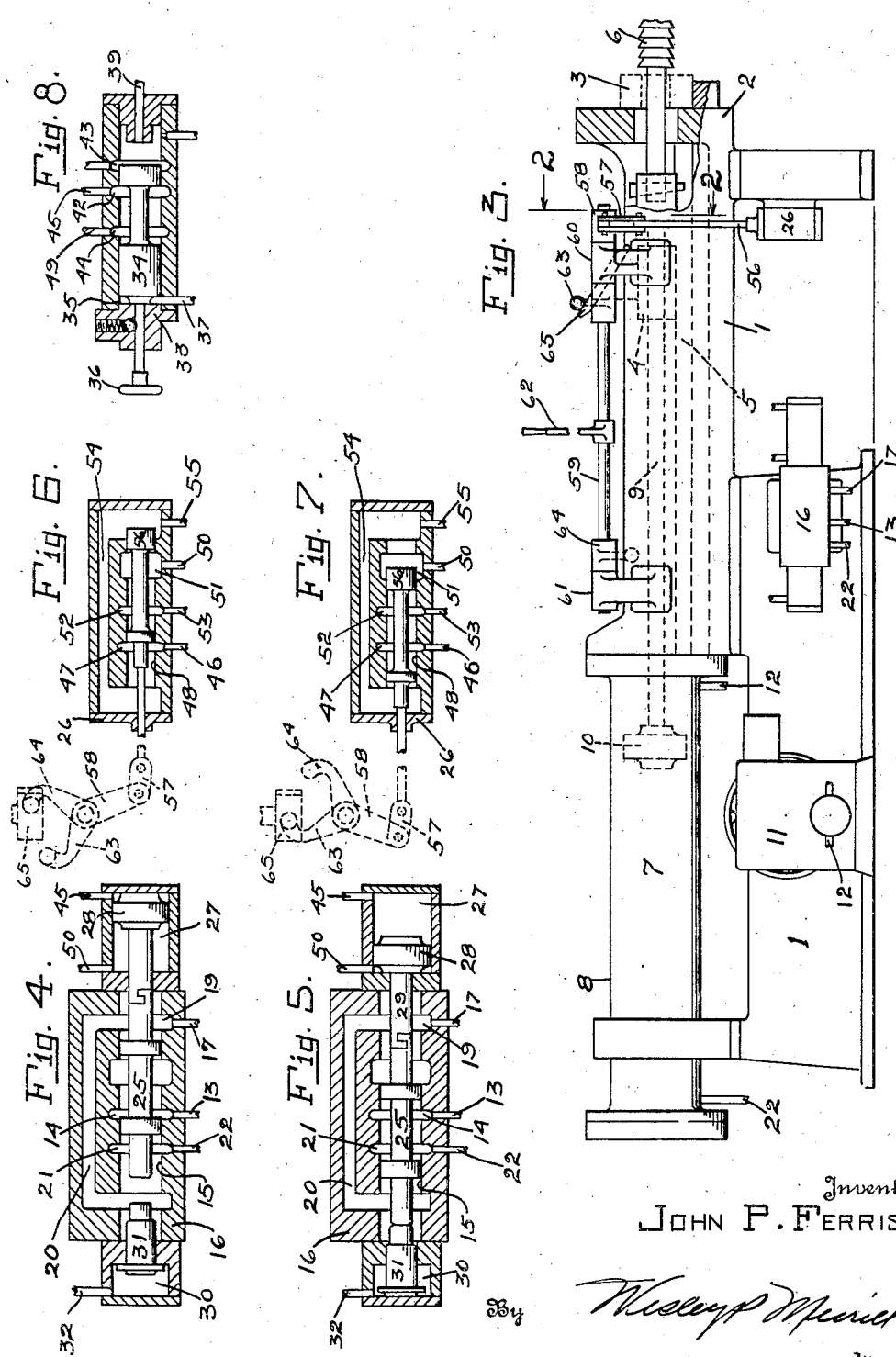
Inventor
JOHN P. FERRIS.

Patented Feb. 14, 1933

1,897,386

UNITED STATES PATENT OFFICE

JOHN P. FERRIS, OF MILWAUKEE, WISCONSIN, ASSIGNOR TO THE OILGEAR COMPANY, OF MILWAUKEE, WISCONSIN, A CORPORATION OF WISCONSIN

BROACHING MACHINE

Application filed May 31, 1930. Serial No. 457,714.

This invention relates to machines in which a carriage is moved in one direction at a predetermined cutting rate and then retracted at high speed, such as a broaching machine.

The machine to which the invention applies in particular has a tool carriage to which a tool is attached, a hydraulic motor connected to the carriage, a pump for supplying liquid to the motor to cause it to move the carriage in one direction at a predetermined cutting rate and to retract the same at high speed, and means for varying the rate of delivery of liquid to the motor to vary the cutting rate of the tool.

An object of the invention is to retract the tool at a suitable and relatively high speed which remains substantially constant throughout a wide variation in the delivery rate of the pump.

According to the invention, the pump delivers liquid into the gland end of the cylinder to move the tool at the cutting speed and the liquid in the head end of the cylinder is discharged into the intake side of the pump. When the tool is retracted, both ends of the cylinder are connected to the discharge side of the pump and the tool is retracted by the differential between the total forces exerted upon the opposite ends of the piston, due to the rod end of the piston having a smaller effective area than the other end thereof, and liquid is bypassed from one end of the cylinder to the other end thereof so that the pump delivers to the cylinder only an amount of liquid corresponding to the displacement of the piston rod. The rod displacement is such that the volume of liquid required for the lowest cutting speed is sufficient to return the piston at a suitably high speed and, when the pump is adjusted to deliver the volume of liquid required to produce a higher cutting speed, the liquid delivered by the pump in excess of the amount required to return the piston is discharged through a resistance valve into the sump of the pump.

A broaching machine embodying the invention is illustrated in the accompanying drawings in which the views are as follows:

Fig. 1 is a schematic drawing showing the hydraulic circuit of the broaching machine with the plungers of the valves in the positions occupied when the machine is idle.

Fig. 2 is a detail view of the operating lever, taken on the line 2—2 of Fig. 3 and arranged to show the relation of the lever to the control valve.

Fig. 3 is a side view of the broaching machine.

Fig. 4 is a longitudinal section showing the operating valve plunger in position to cause the piston of the motor to be moved at cutting speed.

Fig. 5 is a similar view showing the operating valve plunger in position to cause the piston to be retracted.

Figs. 6 and 7 are longitudinal sections showing the control valve in positions corresponding, respectively, to the positions of the operating valve plunger shown in Figs. 4 and 5.

Fig. 8 is a longitudinal section through the safety valve.

The broaching machine has a bed 1, a support 2 for carrying a piece of work 3, a tool carriage or head 4 slidable upon ways 5 arranged longitudinally of the bed 1 and carried thereby, a tool 6 attached to the carriage 4 and reciprocated thereby for operating upon the work 3, a hydraulic motor 7 which has its cylinder 8 carried by the bed 1 and the rod 9 of its piston 10 attached to the carriage 4 to reciprocate the same, and a variable delivery pump 11 for supplying liquid to the motor 7.

The discharge outlet of the pump 11 is connected by a pipe 12 to the gland or power end of the motor cylinder 8 and by a branch 13 of the pipe 12 to an annular port 14 which is formed in the bore 15 of an operating valve 16.

The intake of the pump 11 is connected by a pipe 17 and a resistance valve 18 to an annular port 19 which is formed in the valve 16 at one end of the bore 15 and connected to the other end of the bore 15 by a duct 20 formed in the valve body.

The bore 15 also has a port 21 formed in the wall thereof and connected by a pipe 22 to the head or return end of the cylinder 8. The port 21 is also connected through a resistance valve 23 to a drain pipe 24 which discharges into the sump of the pump 11.

The valve 16 is operated hydraulically and the movement of its plunger 25 is controlled by a control valve 26 which is connected between the discharge side of the pump 11 and a control chamber 27 which forms a part of the valve 16 and contains a piston 28 whose rod 29 extends into the bore 15 and is connected to the end of the plunger 25.

The valve 16 also has a control chamber 30 arranged upon its other end and provided with a plunger 31 which extends into the bore 15 to abut the other end of the plunger 25 and is subjected at all times to pump pressure through a pipe 32 which connects the outer end of the chamber 30 to the delivery pipe 12.

The movement of the valve plunger 25 is also subject to the control of a safety valve 33 which is connected between the control valve 26 and the control chamber 27 and adapted to cause the plunger 25 to be returned to its neutral position, as shown in Fig. 1, whenever the pressure in the delivery pipe 12 reaches a predetermined maximum, thus protecting the machine and the tool against excessive strains.

The safety valve 33 has a plunger 34 arranged in its bore 35 and adapted to be moved into operative position by hydraulic pressure and to be returned to its neutral position by a knob 36 attached to its stem.

The bore 35 of the valve 33 is connected at one end to the drain pipe 24 by a pipe 37 and at the other end by a choke 38 and also by a pipe 39 and a low pressure resistance valve 40. The pipe 39 is also connected through a high pressure resistance valve 41 to the delivery pipe 12.

Whenever the pressure in the delivery pipe 12 becomes sufficient to overcome the resistance of the high pressure valve 41, liquid will flow through the pipe 39 and force the plunger 34 into the position shown in Fig. 8 and cause the machine to be stopped, and any excess liquid which passes through the valve 41 will flow through the low pressure valve 40 into the drain pipe 24 and be returned thereby to the sump of the pump 11.

The safety valve 33 has three annular ports 42, 43 and 44 formed in the wall of the bore 35 and controlled by the plunger 34. The port 42 is normally open and is connected by a pipe 45 to the outer end of the control chamber 27. The port 43 is normally open and is connected by a pipe 46 to an annular port 47 formed in the bore 48 of the control valve 26 near one end thereof. The port 44 is normally closed by the plunger 34 and is connected by a pipe 49 to a pipe 50 which has one end connected to the inner end of the control chamber 27 and its other end connected to an annular port 51 formed in the valve 26 near the other end of its bore 48.

The valve 26 also has an annular port 52 formed in its bore 48 intermediate the ports 47 and 51 and connected by a pipe 53 to the pipe 32. The two ends of the bore 48 are in communication with each other through a bypass duct 54 which is formed in the valve casing around the bore 48 and connected by a drain pipe 55 to the sump of the pump 11.

The plunger 56 of the valve 26 is connected by a pair of links 57 to a lever 58 which is attached to a shaft 59 arranged longitudinally of the bed 1 and supported in bearings 60 and 61 carried thereby.

The shaft 59 has attached thereto a hand lever 62, for operating the valve 26 manually, and two arms 63 and 64 which are engaged alternately by a cam 65 to operate the valve 26 automatically. The cam 65 is carried by the carriage 4 and adapted to engage one of the arms at each end of the stroke of the machine. The arms 63 and 64 may be secured upon the shaft 59 in adjusted positions and thereby vary the stroke of the machine.

With the pump 11 in operation and the valve plungers 25, 34 and 56 in the positions shown in Fig. 1, the plunger 31 and both ends of the piston 28 are open to pump pressure which holds the plunger 25 in its neutral position. The rod end of the motor piston 10 is open to pump pressure and tends to move rearwardly but cannot do so as the liquid in the rear end of the cylinder 8 is trapped therein by the port 21 in the valve 16 being closed by the plunger 25.

The liquid delivered by the pump 11 passes through the pipe 12, the branch 13, the port 14, the bore 15, the port 19 and into the pipe 17 where it meets the resistance of the valve 18, the adjustment of which determines the minimum hydraulic pressure in the circuit when the pump is in operation. The pipe 17 then delivers the liquid to the intake of the pump 11.

When the hand lever 62 is moved downwardly to the position 66 indicated in dotted lines in Fig. 2, the arms 63 and 64 are raised and the valve plunger 56 is moved to its rear position, as shown in Fig. 6, and separates the port 47 from the port 52 and opens the same to the duct 54 so that the front end of the chamber 27 is open to the drain pipe 55.

Liquid will now flow from the pump 11 through the pipes 12, 32 and 53, the port 52, the bore 48, the port 51 and the pipe 50 to the inner end of the chamber 27 and move the piston 28 outwardly, and the piston 28 will move the plunger 25 to uncover the port 21 and separate the port 14 from the port 19, as shown in Fig. 4.

The pump 11 will now deliver liquid through pipe 12 to the power end of the cylinder 8 and force the piston 10 rearwardly at the rate determined by the adjustment of the pump, and the tool 6 will be drawn through the work 3 at the predetermined cutting speed and broach the same.

The liquid in the rear part of the cylinder 8 will be expelled through the pipe 22, the port 21, the bore 15, the duct 20, the port 19, the pipe 17 and the resistance valve 18 into the intake of the pump 11, the resistance of the valve 18 insuring that the tool 6 will be moved through the work at a steady and uniform rate.

When the carriage 4 approaches the end of its stroke, the cam 65 engages the arm 64 and forces the same downwardly, thus rotating the shaft 59 and moving the levers 58 and 62 and the valve plunger 56 to their initial positions as shown in Fig. 1.

Liquid from the pump 11 now flows through the pipes 12, 32 and 53, the port 52, the bore 48 of the valve 26, the port 47, the pipe 46, the port 43, the bore 35 of the valve 33, the port 42 and the pipe 45 to the outer end of the chamber 27 and acts upon the outer end of the piston 28 which has a greater effective area than the road end thereof so that the piston 28 moves inwardly and moves the valve plunger 25 through the bore 15 of the valve 16 until it reaches its neutral position where it is stopped by the plunger 31.

The tool 6 and the work 3 are then removed and the hand lever 62 raised to the position 67 indicated in dotted lines in Fig. 1, thus lowering the arms 63 and 64 and moving the plunger 56 of the valve 26 to its forward position, as shown in Fig. 7.

The inner end of the chamber 27 is now open to the drain through the pipe 50, the port 51, the bore 48, and the pipe 55. Liquid is delivered to the outer end of the chamber 27 as previously described and forces the piston 28 to its innermost position and moves the valve plunger 25 against the resistance of the control plunger 31 to the position shown in Fig. 5.

In this position, the ports 14 and 21 in the valve 16 are in communication with each other and both ends of the cylinder 8 are open to pump pressure but the rear end of the piston 10 has a greater effective area than the front end thereof, due to the area covered by the rod 9, so that a greater total force is exerted thereon than against the front end thereof.

Liquid from the pump 11 is delivered to the rear or return end of the cylinder 8 through the pipe 12, the branch 13, the port 14, the bore 15, the port 21 and the pipe 22 and moves the piston 10 forward, and the liquid in the forward end of the cylinder 8 is bypassed to the rear end thereof through the pipe 12, the branch 13, the port 14, the bore 15, the port 21, and the pipe 22.

The pump 11, therefore, has to deliver to the rear end of the cylinder 8 only a quantity of liquid equal to the displacement of the piston rod 9 and is thus able to move the piston 10 forward at high speed.

The piston 10 and its rod 9 are so proportioned that, when the pump 11 is adjusted to deliver liquid at the rate required to move the tool 6 rearward at the lowest cutting speed ordinarily employed, they will be moved forward at a predetermined return speed which is the highest practical return speed. For instance, the return speed may be three times the cutting speed.

The force required to move the piston 10 forward at the predetermined return speed, and to bypass liquid from the front end of the cylinder 8 to the rear end thereof, causes the pump to create a given pressure which is proportional to the return speed, and the resistance valve 23 is adjusted to remain closed at the given pressure but to open upon an increase above that pressure.

When the pump is adjusted to deliver liquid at a higher rate in order to obtain a higher cutting speed, the liquid delivered by the pump tends to return the piston 10 at a rate proportional to the higher cutting speed, for instance three times as fast as the higher cutting speed, and this high return speed would require such a high velocity in the bypassed liquid as to be impractical.

However, the force required to move the piston 10 faster than the predetermined return speed causes the pump to create sufficient pressure to open the resistance valve 23 which allows the escape of liquid delivered by the pump in excess of the volume required to move the piston 10 at the predetermined return speed.

The carriage 4 and the tool 6 will thus be retracted at the same high speed regardless of the variation in the cutting speed of the tool 6 within any limits which are commercially practical.

As the carriage 4 approaches its normal or initial position, the cam 65 engages the arm 63 and rotates the shaft 59 to move the valve plunger 56 to its initial position, as shown in Fig. 1, and opens both ends of the control chamber 27 to the pump pressure and enables the plunger 31 to move the valve plunger 25 to its neutral position.

Should the tool 6 meet with excessive resistance when it is being drawn through the work 3 at the cutting speed, the pressure in the pipe 12 will rise and, whenever this pressure reaches a predetermined maximum, the resistance of the resistance valve 41 will be overcome and liquid will pass therethrough and enter the safety valve 33 through the pipe 39 and force the valve plunger 34 to its outermost position, as shown in Fig. 8. The excess liquid which passes the resistance valve 41 is discharged through the resistance valve 40 into the drain pipe 24.

The movement of the plunger 34 uncovers the port 44 and allows liquid from the pipe 50, which at this time is open to pump pressure, to flow through the pipe 49, the port 44, the bore 35 of the valve 33, the port 42 and the pipe 45 into the outer end of the chamber 27 and force the piston 28 and the valve plunger 25 to their neutral positions and stop the machine, as previously described.

The invention herein set forth is susceptible of various modifications and adaptations without departing from the scope thereof as hereafter claimed.

The invention is hereby claimed as follows:

1. The combination, with a machine having a tool carriage, a hydraulic motor connected to said carriage and having a piston and a cylinder movable relatively to each other, and a variable delivery pump for delivering liquid at variable rates to the power end of said cylinder to move said carriage in one direction at various cutting speeds and to deliver liquid to the return end of said cylinder to return said carriage at high speed, of means for causing said carriage to be returned at a high speed which remains substantially constant throughout a wide variation in the rate of delivery of said pump, comprising valve means connected between said pump and said motor and operable to direct liquid from said pump to the power end of said cylinder and to return liquid from the return end of said cylinder directly to said pump and thereby cause said carriage to be moved at a cutting speed, and also operable to direct liquid from said pump to the return end of said cylinder and to direct the liquid discharged from the power end of said cylinder to said return end and thereby cause said carriage to be returned at high speed, and a relief valve communicating with the return end of said cylinder and allowing a portion of said liquid to return to said pump.

2. The combination, with a machine having a tool carriage, a hydraulic motor connected to said carriage and having a piston and a cylinder movable relatively to each other, and a variable delivery pump for delivering liquid at various rates to the power end of said cylinder to move said carriage in one direction at various cutting speeds and to deliver liquid to the return end of said cylinder to return said carriage at high speed, of means for causing said carriage to be returned at a high speed which remains substantially constant throughout a wide variation in the rate of delivery of said pump, comprising valve means connected between said pump and said motor and operable to direct liquid from said pump to the power end of said cylinder and to return liquid from the return end of said cylinder directly to said pump and thereby cause said carriage to be moved at a cutting speed, and also operable to direct liquid from said pump to the return end of said cylinder and to direct the liquid discharged from the power end of said cylinder to said return end and thereby cause said carriage to be returned at high speed, a relief valve communicating with the return end of said cylinder and allowing a portion of said liquid to return to said pump, and hydraulic means for operating said valve means.

3. The combination, with a machine having a tool carriage, a hydraulic motor connected to said carriage and having a piston and a cylinder movable relatively to each other, and a variable delivery pump for delivering liquid at various rates to the power end of said cylinder to move said carriage in one direction at various cutting speeds and to deliver liquid to the return end of said cylinder to return said carriage at high speed, of means for causing said carriage to be returned at a high speed which remains substantially constant throughout a wide variation in the rate of delivery of said pump, comprising valve means connected between said pump and said motor and operable to direct liquid from said pump to the power end of said cylinder and to return liquid from the return end of said cylinder directly to said pump and thereby cause said carriage to be moved at a cutting speed, and also operable to direct liquid from said pump to the return end of said cylinder and to direct the liquid discharged from the power end of said cylinder to said return end and thereby cause said carriage to be returned at high speed, a relief valve communicating with the return end of said cylinder and allowing a portion of said liquid to return to said pump, hydraulic means for operating said valve means, and a control valve operated automatically in response to the movement of said carriage for controlling said hydraulic means.

4. The combination, with a machine having a tool carriage, a hydraulic motor connected to said carriage and having a piston and a cylinder movable relatively to each other, and a variable delivery pump for delivering liquid at various rates to the power end of said cylinder to move said carriage in one direction at various cutting speeds and to deliver liquid to the return end of said cylinder to return said carriage at high speed, of means for causing said carriage to be returned at a high speed which remains substantially constant throughout a wide variation in the rate of delivery of said pump, comprising valve means connected between said pump and said motor and operable to direct liquid from said pump to the power end of said cylinder and to return liquid from the return end of said cylinder directly to said pump and thereby cause said carriage to be moved at a cutting speed, and also operable to direct liquid from said pump to the return end of said cylinder and to direct the liquid discharged from the power end of said cylinder to said return end and thereby cause said carriage to be returned at high speed, a relief valve communicating with the return end of said cylinder and allowing a portion of said liquid to return to said pump, hydraulic means for operating said valve means, a control valve operated automatically in response to the movement of said carriage for controlling said hydraulic means, and a safety valve connected between said hydraulic means and said control valve for limiting the hydraulic pressure in said cylinder.

5. The combination, with a machine having a tool carriage, a hydraulic motor connected to said carriage and having a piston and a cylinder movable relatively to each other, and a variable delivery pump for delivering liquid at various rates to the power end of said cylinder to move said carriage in one direction at various cutting speeds and to deliver liquid to the return end of said cylinder to return said carriage at high speed, of means for causing said carriage to be returned at high speed which remains substantially constant throughout a wide variation in the rate of delivery of said pump, comprising a valve connected between said pump and said motor and having a plunger therein for controlling the flow of liquid therethrough, hydraulic means for moving said plunger to one position to direct liquid from said pump to the power end of said cylinder and to return liquid from the return end of said cylinder directly to said pump and thereby cause said carriage to be moved at a cutting speed, and for moving said plunger to another position to direct liquid from said pump to the return end of said cylinder and to direct the liquid discharged from the power end of said cylinder to said return end and thereby cause said carriage to be returned at high speed, and a relief valve communicating with the return end of said cylinder and allowing a portion of said liquid to return to said pump.

6. The combination, with a machine having a tool carriage, a hydraulic motor connected to said carriage and having a piston and a cylinder movable relatively to each other, and a variable delivery pump for delivering liquid at various rates to the power end of said cylinder to move said carriage in one direction at various cutting speeds and to deliver liquid to the return end of said cylinder to return said carriage at high speed, of means for causing said carriage to be returned at high speed which remains substantially constant throughout a wide variation in the rate of delivery of said pump, comprising a valve connected between said pump and said motor and having a plunger therein for controlling the flow of liquid therethrough, hydraulic means for moving said plunger to one position to direct liquid from said pump to the power end of said cylinder and to return liquid from the return end of said cylinder directly to said pump and thereby cause said carriage to be moved at a cutting speed, and for moving said plunger to another position to direct liquid from said pump to the return end of said cylinder and to direct the liquid discharged from the power end of said cylinder to said return end and thereby cause said carriage to be returned at high speed, a relief valve communicating with the return end of said cylinder and allowing a portion of said liquid to return to said pump, and hydraulic means for returning said valve plunger to its initial position.

7. The combination, with a machine having a tool carriage, a hydraulic motor connected to said carriage and having a piston and a cylinder movable relatively to each other, and a variable delivery pump for delivering liquid at various rates to the power end of said cylinder to move said carriage in one direction at various cutting speeds and to deliver liquid to the return end of said cylinder to return said carriage at high speed, of means for causing said carriage to be returned at high speed which remains substantially constant throughout a wide variation in the rate of delivery of said pump, comprising a valve connected between said pump and said motor and having a plunger therein for controlling the flow of liquid therethrough, hydraulic means for moving said plunger to one position to direct liquid from said pump to the power end of said cylinder and to return liquid from the return end of said cylinder directly to said pump and thereby cause said carriage to be moved at a cutting speed, and for moving said plunger to another positon to direct liquid from said pump to the return end of said cylinder and to direct the liquid discharged from the power end of said cylinder to said return end and thereby cause said carriage to be returned at high speed, and a relief valve communicating with the return end of said cylinder and allowing a portion of said liquid to return to said pump, hydraulic means for returning said valve plunger to its initial position, and a control valve operated in response to the movement of said carriage for controlling said hydraulic means.

8. The combination, with a machine having a tool carriage, a hydraulic motor connected to said carriage and having a piston and a cylinder movable relatively to each other, and a variable delivery pump for delivering liquid at various rates to the power end of said cylinder to move said carriage in one direction at various cutting speeds and to deliver liquid to the return end of said cylinder to return said carriage at high speed, of means for causing said carriage to be returned at high speed which remains substantially constant throughout a wide variation in the rate of delivery of said pump, comprising an operting valve connected between said pump and said motor and having a plunger therein for controlling the flow of liquid therethrough, hydraulic means for moving said plunger to one position to direct liquid from said pump to the power end of said cylinder and to return liquid from the return end of said cylinder directly to said pump and thereby cause said carriage to be moved at a cutting speed, and for moving said plunger to another position to direct liquid from said pump to the return end of said cylinder and to direct the liquid discharged from the power end of said cylinder to said return end and thereby cause said carriage to be returned at high speed, and a relief valve having its inlet connected between the return end of said cylinder and said valve and its outlet connected to said pump to allow a portion of said liquid to return to said pump.

9. The combinaton, with a machine having a tool carriage, a hydraulic motor connected to said carriage and having a piston and a cylinder movable relatively to each other, and a variable delivery pump for delivering liquid to said motor at various rates to move said carriage in one direction at various cutting speeds, of means for causing said carriage to be moved in the opposite direction at a high speed which remains substantially constant throughout a wide variation in the rate of delivery of said pump, comprising an operating valve connected between said pump and said motor and having a plunger therein for controlling the flow of liquid therethrough, hydraulically operated means for moving said plunger to one position to direct liquid from said pump to one end of said cylinder and liquid from the other end of said cylinder to said pump to cause said carriage to be moved in one direction at a predetermined cutting speed and for moving said plunger to another position to direct liquid from said pump into the other end of said cylinder and to bypass liquid from one end of said cylinder to the other end thereof to cause said carriage to be moved in the opposite direction at high speed, a resistance valve having its inlet connected between said valve and said cylinder to permit the escape of excess liquid delivered by said pump, a control valve connected between said pump and said hydraulically operated means for controlling the operation thereof and having a plunger therein for controlling the flow of liquid therethrough, and means for operating said control valve including a shaft carried by said machine, an operating lever fixed on said shaft and mechanically connected to said plunger, arms fixed on said shaft, a hand lever fixed on said shaft for rotating the same to move said plunger into operative position, and a cam carried by said carriage for engaging said arms alternately to rotate said shaft and thereby return said plunger to its initial position.

10. The combination, with a machine having a tool carriage, a hydraulic motor connected to said carriage and having a piston and a cylinder movable relatively to each other, and a variable delivery pump for delivering liquid to said motor at various rates to move said carriage in one direction at various cutting speeds, of means for causing said carriage to be moved in the opposite direction at a high speed which remains substantially constant throughout a wide variation in the rate of delivery of said pump, comprising an operating valve connected between said pump and said motor and having a plunger therein for controlling the flow of liquid therethrough, hydraulically operated means for moving said plunger to one position to direct liquid from said pump to one end of said cylinder and liquid from the other end of said cylinder to said pump to cause said carriage to be moved in one direction at a predetermined cutting speed and for moving said plunger to another position to direct liquid from said pump into the other end of said cylinder and to bypass liquid from one end of said cylinder to the other end thereof to cause said carriage to be moved in the opposite direction at high speed, a resistance valve having its inlet connected between said valve and said cylinder to permit the escape of excess liquid delivered by said pump, a control valve connected between said pump and said hydraulically operated means for controlling the operation thereof, a safety valve connected between said hydraulically operated means and said pump and operable hydraulically to direct liquid to said hydraulically operated means and cause the same to operate said operating valve and thereby stop the machine, and a resistance valve connected between said safety valve and said pump and responsive to a predetermined maximum pressure to pass liquid under pressure to said safety valve to operate the same.

11. A broaching machine, comprising a bed, a tool carriage carried by said bed, a motor cylinder secured to said bed, a piston in said motor cylinder, a piston rod connecting said piston to said carriage, a variable delivery pump for supplying liquid to said cylinder to operate said piston, valve means connected between said pump and said cylinder for controlling the delivery of liquid to said cylinder, hydraulic means for operating said valve means to direct liquid from said pump to the rod end of said cylinder and to return liquid from the other end of said cylinder to said pump and thereby cause said carriage to be moved at a cutting speed and for operating said valve means to connect both ends of said cylinder to the discharge side of said pump and to direct liquid from the rod end of said cylinder to the other end thereof and thereby cause said piston to be returned at high speed, a relief valve having its inlet connected between said other end of said cylinder and said valve means and its outlet connected to said pump to allow excess liquid delivered by said pump to return thereto, a control valve for controlling said hydraulic means, and means operated by the movement of said carriage for operating said control valve.

12. A broaching machine, comprising a bed, a tool carriage carried by said bed, a motor cylinder secured to said bed, a piston in said motor cylinder, a piston rod connecting said piston to said carriage, a variable delivery pump having its discharge connected to the forward end of said motor cylinder, an operating valve having its cylinder connected to the rear end of said motor cylinder and to the intake and the discharge of said pump and its piston normally in a neutral position to allow liquid to bypass between said discharge and said intake, means for moving said plunger to one position to direct liquid into the forward end of said motor cylinder and to return liquid from the rear end thereof to said pump and for moving said plunger to another position to direct liquid into the rear end of said motor cylinder and to allow liquid to bypass through said valve from the forward end to the rear end of said motor cylinder, and a resistance valve having its inlet connected between said valve and the rear end of said motor cylinder to allow escape of excess liquid delivered by said pump.

13. A broaching machine, comprising a bed, a motor cylinder carried by said bed, a piston arranged in said cylinder and provided with a piston rod having means upon its outer end for connecting the same to a broach, a variable delivery pump for delivering liquid at various rates to said cylinder to operate said piston at various speeds, an operating valve for controlling the delivery of liquid to said cylinder, a delivery pipe connecting said pump to the forward end of said cylinder and to said valve, a discharge pipe connecting said valve to the intake of said pump, a return pipe connecting the rear end of said cylinder to said valve, a relief valve connected between said return pipe and the sump of said pump, hydraulic means for operating said valve, a control valve hydraulically connected to said pump and to said hydraulic means for controlling the operation of said operating valve, and means for operating said control valve.

14. A broaching machine, comprising a bed, a motor cylinder carried by said bed, a piston arranged in said cylinder and provided with a piston rod having means upon its outer end for connecting the same to a broach, a variable delivery pump for delivering liquid at various rates to said cylinder to operate said piston at various speeds, an operating valve for controlling the delivery of liquid to said cylinder, a delivery pipe connecting said pump to the forward end of said cylinder and to said valve, a discharge pipe connecting said valve to the intake of said pump, a return pipe connecting the rear end of said cylinder to said valve, a relief valve connected between said return pipe and the sump of said pump, hydraulic means for operating said valve, a control valve hydraulically connected to said pump and to said hydraulic means for controlling the operation of said operating valve, and means operated by the movement of said piston for operating said control valve.

JOHN P. FERRIS.